(12) United States Patent
Ertz et al.

(10) Patent No.: US 8,235,170 B1
(45) Date of Patent: Aug. 7, 2012

(54) INTEGRATED TAILCONE MUFFLER ASSEMBLIES AND METHODS

(75) Inventors: Timothy Ertz, Scottsdale, AZ (US); Chuck Royalty, Tempe, AZ (US); Yogendra Yogi Sheoran, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/097,904

(22) Filed: Apr. 29, 2011

(51) Int. Cl.
*F02K 1/00* (2006.01)

(52) U.S. Cl. .......................... 181/213; 244/1 N; 454/69

(58) Field of Classification Search .............. 181/213; 244/1 N; 454/69
See application file for complete search history.

(56) References Cited

U.S. PATENT DOCUMENTS

| | | | |
|---|---|---|---|
| 3,575,261 A | | 4/1971 | Medawar |
| 3,826,331 A | | 7/1974 | Scharton et al. |
| 3,927,522 A | | 12/1975 | Bryce et al. |
| 3,998,047 A | | 12/1976 | Walker |
| 4,214,441 A | * | 7/1980 | Mouritsen et al. ............... 60/262 |
| 5,097,656 A | | 3/1992 | Napier |
| 6,360,844 B2 | * | 3/2002 | Hogeboom et al. .......... 181/213 |
| 6,571,549 B1 | | 6/2003 | Stanek |
| 6,615,576 B2 | * | 9/2003 | Sheoran et al. ................. 60/39.5 |
| 6,973,790 B2 | * | 12/2005 | Suenaga et al. .................. 60/725 |
| 7,055,329 B2 | | 6/2006 | Martens et al. |
| 7,418,813 B2 | * | 9/2008 | Wollenweber .................. 60/39.5 |
| 7,578,369 B2 | | 8/2009 | Francisco et al. |
| 2008/0057848 A1 | * | 3/2008 | Gray et al. ....................... 454/69 |
| 2009/0078496 A1 | * | 3/2009 | Francisco et al. .............. 181/213 |

* cited by examiner

*Primary Examiner* — Forrest M Phillips
(74) *Attorney, Agent, or Firm* — Ingrassia Fisher & Lorenz, P.C.

(57) ABSTRACT

Methods integrated tailcone muffler (ITM) is provided for minimizing noise generated while discharging pressurized air from one or more aircraft gas turbine engines. The ITM comprises a tail cone defining a conical backing cavity, the conical backing cavity having a large forward end and a narrow aft end and a porous exhaust liner with a first end and a second end, the first end coupled to an oil cooler eductor discharge plenum of a first gas turbine engine of the one or more gas turbine engines and a second end discharging to atmosphere via the narrow aft end of the conical backing cavity. The ITM further comprises a bleed air discharge conduit configured to discharge pressurized bleed air from the one or more gas turbine engines into the conical backing cavity and a firewall bulkhead defining the large forward end of the conical backing cavity, defining a first aperture passing the cylindrical porous exhaust liner and defining a second aperture passing the bleed air discharge conduit, the firewall bulkhead extending radially from both of the cylindrical porous exhaust liner and the bleed air discharge conduit.

20 Claims, 10 Drawing Sheets

INTEGRATED TAILCONE MUFFLER ASSEMBLIES AND METHODS

TECHNICAL FIELD

The present invention generally relates to auxiliary power unit (APU) cooling systems and to the attenuation of APU exhaust and engine surge bleed air that may interfere therewith, and more particularly relates to integrated tailcone muffler (ITM) assemblies and methods for using the same to reduce surge bleed air noise and degrading effects on associated APU oil cooling systems.

BACKGROUND

Modern turboprop and turbofan powered aircraft carry a small gas turbine engine known as an APU in addition to their main propulsion gas turbine engines. Some aircraft carry two APUs. Typically, the APUs are located in a compartment located within the aft section of the aircraft, such as in the tail, forward of the tailcone. APUs have historically been used in aircraft to provide power to aircraft systems when the main engines are not running and to enable starting the main engines without need for external power. Aircraft also need an additional source of power while in flight. Further detail concerning the components and operation of an exemplary tail mounted APU may be found in co-owned, re-issued patent 39,972, which is hereby incorporated by reference in its entirety.

During operation of the APU, heat is generated in the APU compartment from numerous sources including radiation from the APU, convection from an APU oil cooler, and from a generator and other auxiliary equipment. To prevent the temperature in the APU compartment from reaching unacceptable levels, a ventilating or cooling airflow must be provided through the compartment. To provide this cooling airflow, an exhaust eductor has been used. The eductor uses the kinetic energy of the APU exhaust gas to create a modest vacuum in the tailcone to pull ambient cooling airflow through the APU compartment and over the APU oil cooler. Further background detail concerning an exemplary exhaust eductor cooling system may be found in co-owned U.S. Pat. No. 5,265,408, which is hereby incorporated by reference in its entirety.

FIG. 1 is an exemplary prior art diagram of a conventional ITM 100 for the Comac C919 and similar aircraft. The Comac C919 is a 168-190 seat narrow-body airliner to be built by the Commercial Aircraft Corporation of China. The ITM 100 is disposed within an aircraft tailcone 2 having an auxiliary power unit 12 mounted in a compartment forward thereof. The tailcone 2 is generally conical in shape comprising a tapered hollow shell with an aft end (i.e., an apex) that is truncated and opens to the ambient atmosphere (hereinafter "open aft end")

The auxiliary power unit 12 and oil cooler plenum 17 are disposed forward of the tailcone 2. The APU oil cooler 10 and its respective oil cooler plenum 17 are fluidly coupled to an inlet opening of the ITM 100. A surge bleed plenum 99 is also fluidly coupled to the inlet opening of the ITM 100. During normal APU operation exhaust entrains cooling air through the APU compartment, over AU oil cooler 10 and into the cooling plenum. Occasionally when the aircraft shuts off the use of the high pressure bleed air, the bleed air is diverted through the surge plenum 99 into the exhaust system to prevent compressor surge. This quasi-radial dumping of surge bleed air in the mixing plane just downstream of the APU nozzle tends to reduce cooling air flow at the oil cooler.

A hard firewall bulkhead 6 located forward of the ITM 100 separates the APU compartment from the ITM 100 and defines a large forward end of a conical backing cavity 5 and also defines the inlet opening of the ITM 100. The backing cavity 5 is further defined by the skin of the tailcone 2 and by the narrow open aft end 7 of the tailcone. The tailcone 2 acts as the outer casing for the ITM 100 thereby defining the backing cavity 5 of the integrated dual use muffler. The muffler backing cavity 5 acts as both a muffler and as a surge bleed plenum for reducing discharge noise created while venting pressurized surge bleed air.

A cylindrical, porous exhaust liner 4 couples the oil cooler plenum 17 and an exhaust nozzle 13 of the APU 12 to the backing cavity 5 through the inlet opening in the firewall 6 and ultimately to the ambient atmosphere. The porous exhaust liner 4 is typically constructed of a perforated metal sheet, a porous metal wire mesh (e.g. Poroplate®), Feltmetal, any other suitable "linear" liner, or a suitable combination thereof.

The porous exhaust liner 4 has a first end 3 and extends through the inlet opening in the firewall bulkhead 6 to mechanically couple to an exhaust nozzle 13 of the APU 12 for receiving its exhaust flow. The porous exhaust liner 4 has a second end extending to the open aft end 7 of the tail cone 2 for porting mixed exhaust gas from the APU out of the open aft end of the tailcone. As used herein, the term "mixed exhaust gas" comprises APU cooling airflow, exhaust gas, and surge bleed air, as hereinafter described. The porous exhaust liner 4 is fluidly connected with the exhaust nozzle 13, the junction of which comprises an eductor in conjunction with of the APU exhaust nozzle 13, the oil cooler plenum 17 and the porous exhaust liner 4. The APU exhaust is the motive fluid for the eductor (13,17,4), which creates a reduced pressure in the oil cooler plenum 17 downstream of APU nozzle 13, also known as the mixing plane, thereby drawing cooling air through the APU compartment and over the APU oil cooler 10. The mixed exhaust is discharged through ITM 100 an out the open aft end 7.

Ideally, the APU exhaust flowing through the oil cooling eductor (13, 17, 4) can pull sufficient airflow through the APU compartment to provide a sufficient level of cooling by reducing the pressure at the air cooler plenum 17 by a small fraction (e.g., 1%) of the ambient atmospheric pressure. Unfortunately, surge bleed air resulting from unused APU compressor discharge air, is periodically vented from the bleed air system via a mounted surge discharge plenum 99 into the vicinity of the eductor (13, 17, 4) (e.g., downstream of the exhaust mixing plane). The periodic surge of bleed air increases the local pressure in the vicinity of the oil cooler plenum 17, thereby degrading the performance of the oil cooler 10. Further, the noise generated during the venting of the pressurized surge bleed air at the oil cooler plenum 17 is the dominant noise source from the APU 12 when it is not loaded by an onboard auxiliary system such as a heating or cooling system.

FIG. 1A is a graphic illustration of the pressure profile in the ITM 100. The Y axis is the absolute pressure that ranges from zero to ambient pressure of 14.7 PSI. The X axis is the axial distance from the APU nozzle 13 to the open aft end 7.

Looking at curve 150, at the APU nozzle 13 the pressure is significantly higher than 14.7 PSI as the APU exhaust exits the nozzle creating the motive fluid for the oil cooler air eductor (13, 17, 4). At the, oiler cooler plenum 17, a pressure drop is created by the eductor effect of the APU exhaust flow. This pressure drop is typically in the 1-2% range, which causes an absolute pressure drop of approximately 0.147-0.294 PSI. The pressure drop causes the APU cooling air to flow from the APU compartment across the APU oil cooler 10. As the mixed air flow travels down the porous liner 4, it rises to ambient pressure near the open aft end 7, which is in communication with an ambient atmosphere 1.

Looking at the curve 200, surge bleed air exiting the surge bleed air plenum 99 located near the oil cooler plenum 17 periodically adds air volume thereby increasing back pressure in the oil cooler plenum 17. Thus, during periods when bleed air is surging, little or no cooling air passes through the oil cooler 10, thereby degrading its effectiveness.

Further, attempts have been made to attenuate surge bleed air venting noise from APU engine installations by ducting the surge bleed air into a conventional APU turbine engine muffler located in the aircraft tailcone. The results, however, have been less than satisfactory because such conventional mufflers are small relative to the volume of the tailcone, provide insufficient noise attenuation and are relatively heavy, making them unsuitable for small, lightweight aircraft.

Accordingly, it is desirable to provide an ITM and method for using the same. It is also desirable to maintain effectiveness of the APU exhaust eductor (13, 17, 4), minimize its weight and complexity, improve oil cooler performance, and decrease surge bleed noise. Furthermore, other desirable features and characteristics of the present invention will become apparent from the subsequent detailed description of the invention and the appended claims, taken in conjunction with the accompanying drawings and this background of the invention.

BRIEF SUMMARY

An integrated tailcone muffler (ITM) is provided. The ITM comprises a tail cone defining a conical backing cavity, the conical backing cavity having a large forward end and a narrow aft end and a porous exhaust liner with a first end and a second end, the first end coupled to an oil cooler eductor discharge plenum of a gas turbine engine and a second end discharging to atmosphere via the narrow aft end of the conical backing cavity. The ITM further comprises a bleed air discharge conduit configured to discharge pressurized bleed air from the one or more gas turbine engines into the conical backing cavity and a firewall bulkhead defining the large forward end of the conical backing cavity, defining a first aperture passing the cylindrical porous exhaust liner and defining a second aperture passing the bleed air discharge conduit, the firewall bulkhead extending radially from both of the cylindrical porous exhaust liner and the bleed air discharge conduit.

A method is provided for minimizing noise generated while discharging pressurized air from one or more aircraft gas turbine engines, the method comprised creating a conical backing cavity defined by a tail cone of an aircraft having a large forward end and a narrow aft end venting to an ambient atmosphere, wherein the large forward end is defined by a firewall bulkhead and inserting a porous exhaust liner comprising a first end and a second end through the conical backing cavity, the porous exhaust liner extending from the narrow aft end of the tail cone through an aperture in the firewall bulkhead, the first end extending through the aperture in the firewall bulkhead and the second end terminating at the narrow aft end of the conical backing cavity. The method further comprises inserting a pressurized air discharge conduit through a second aperture in the firewall bulkhead into the conical backing cavity and discharging pressurized air into the large forward end of the conical backing cavity. Any pressure increase from the pressurized air discharged into the conical backing cavity is immediately and partially dissipated by the relatively large size of the conical backing cavity and the pressure of the pressurized air is further reduced as the pressurized air flows through the porous exhaust liner and is discharged to the ambient atmosphere via its second end.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. Various embodiments disclosed herein are directed to ITM assemblies. The ITM assembly is used in an aircraft tail section that also has an APU mounted therein.

Figure 1:
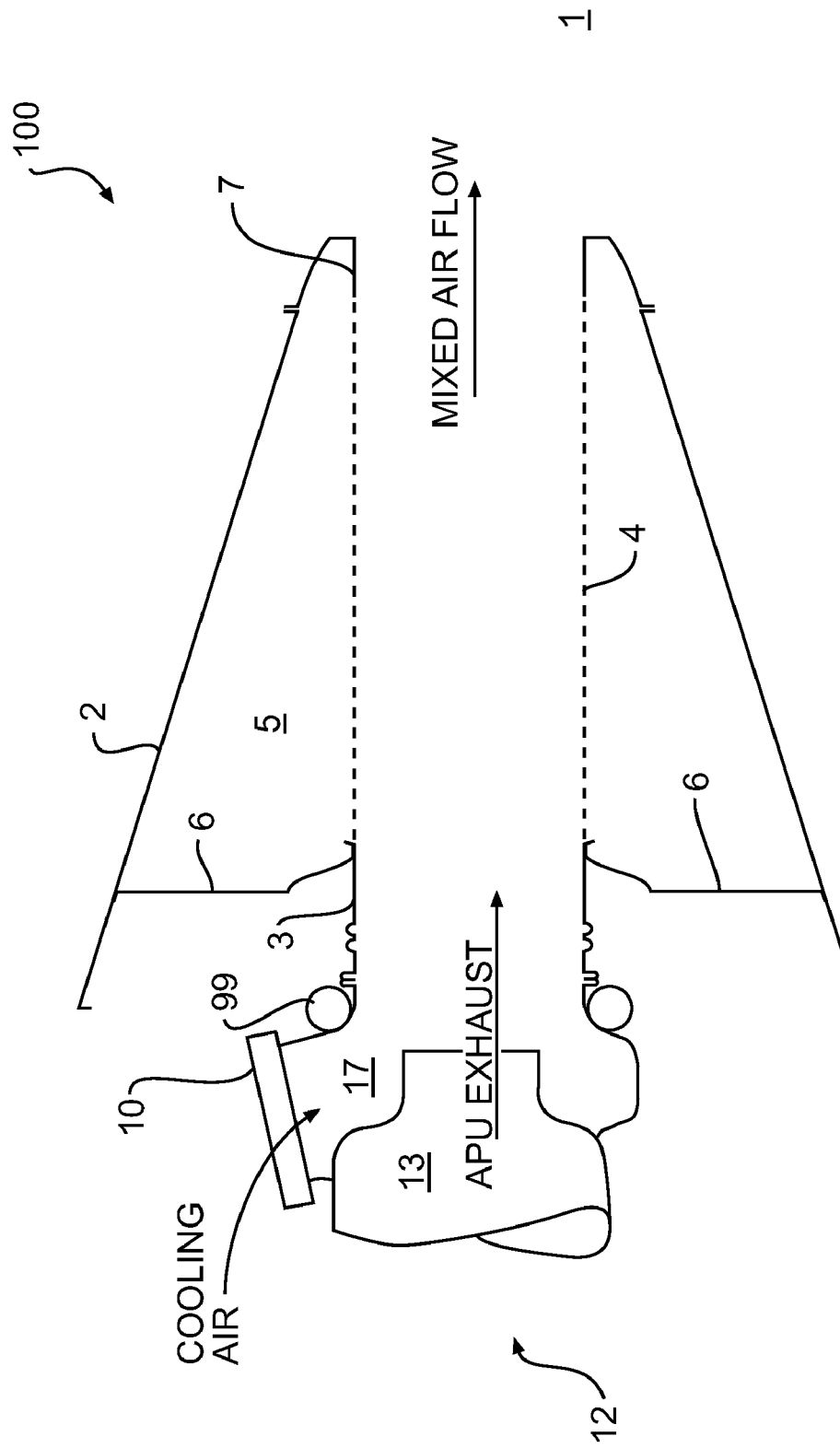
FIG. 1 is a simplified cross sectional diagram of an existing integrated tailcone muffler (ITM)
Figure 1A:
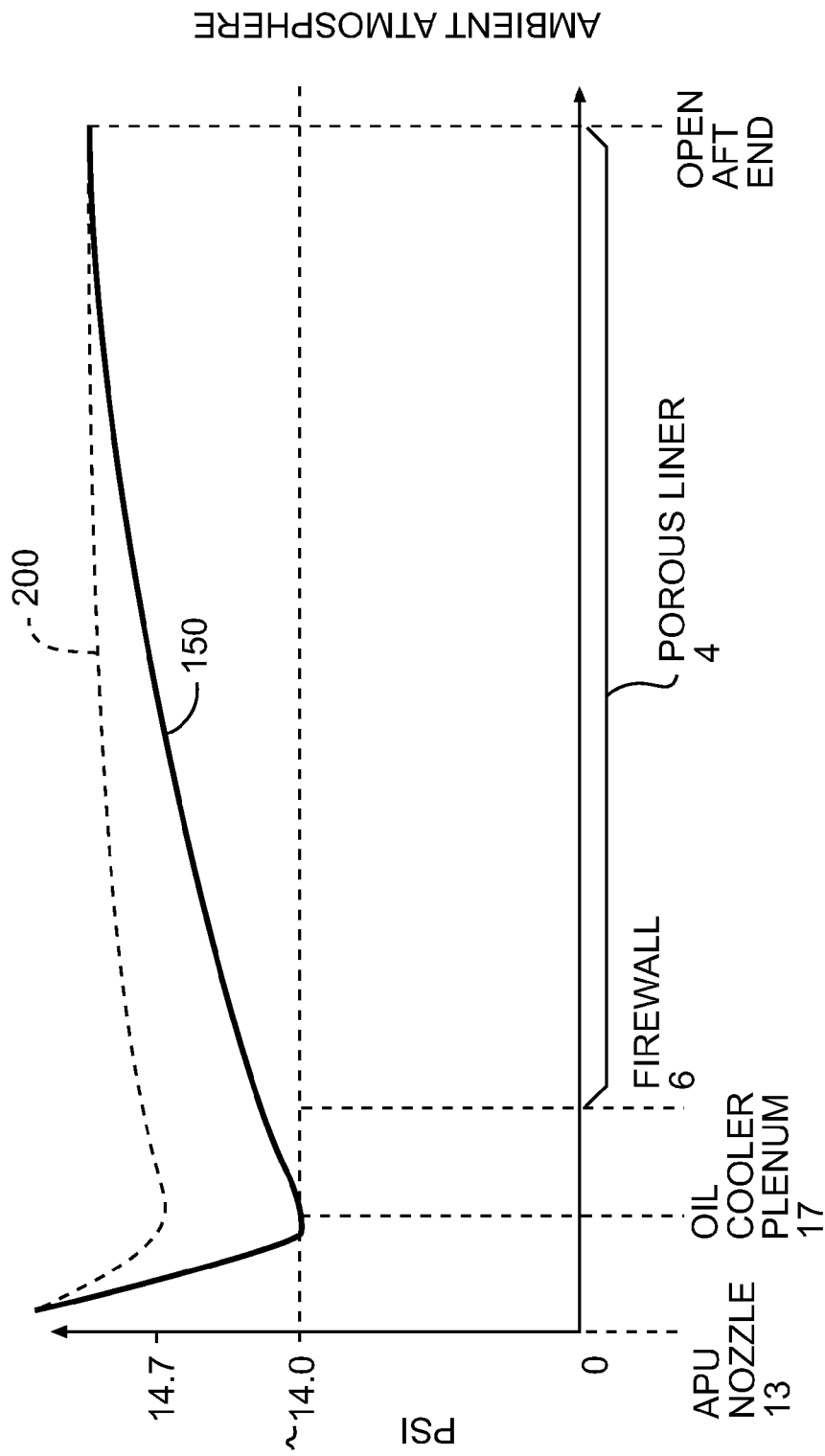
FIG. 1A is a graph of the pressure levels existing between the APU exhaust nozzle and the open aft end of the porous exhaust liner.
Figure 2:
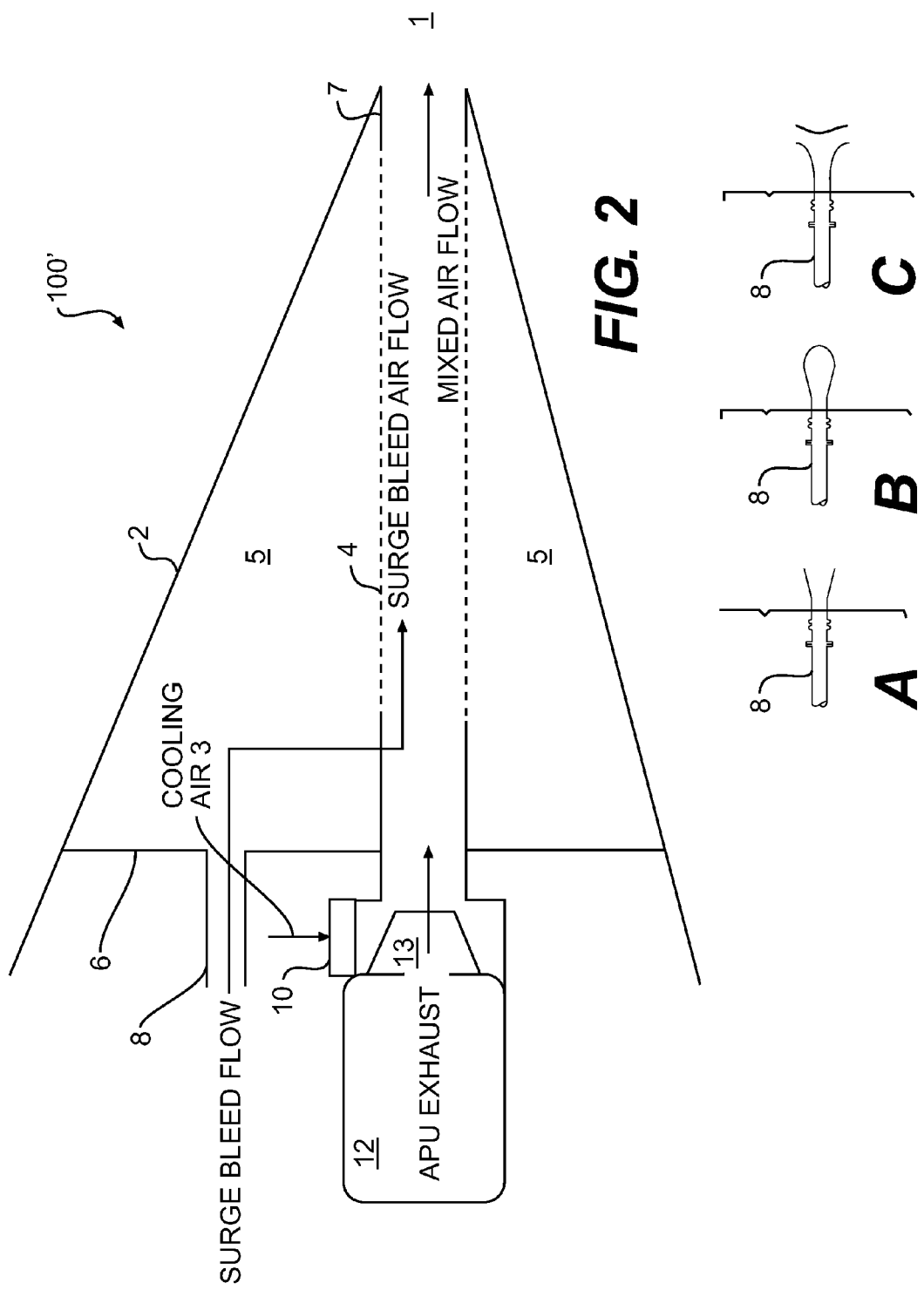
FIGS. 2-9 are simplified cross sectional diagrams of various exemplary embodiments of an ITM as disclosed herein below.

FIG. 2 is a simplified cross sectional view of an exemplary embodiment of an improved ITM 100'. In FIG. 2, the surge bleed air plenum 99 shown in FIG. 1 is removed and a surge bleed air discharge pipe 8 is routed to penetrate the firewall bulkhead 6 at a point radially removed from the oil cooler plenum 17. Thus, instead of discharging surge bleed air into and disturbing the oil cooler plenum 17, the bleed air is discharged into the backing cavity 5 of the tailcone 2.

In some embodiments where there are multiple APUs mounted in the tail section of an aircraft, there may be multiple discharge pipes 8 routed to penetrate the firewall bulkhead 6 at different points or the discharge pipes may be suitably joined and routed through the same firewall bulkhead penetration. The multiple APUs may share the same oil cooler plenum or may exhaust to the ambient atmosphere via separate oil cooler plenums and separate porous exhaust liners 4.

When surge bleeding, the pressure created by the bleed air discharge into the backing cavity 5 rises and forces the bleed air into the porous exhaust liner 4 and out the open end 7 of the tail cone as mixed air flow (i.e., APU exhaust, bleed air, and oil cooling air). By discharging surge bleed air into the backing cavity 5, any back pressure is removed that would have otherwise been created in the oil cooler plenum 17 and simultaneously damps any resulting noise from freely exiting the tail cone 2 through the porous exhaust liner 4 and being audible.

The noise and flow performance of the embodiment of FIG. 2 may be improved by attaching a diffuser (e.g., A, B or C) onto the discharge end of the bleed air discharge pipe 8

Figure 5:
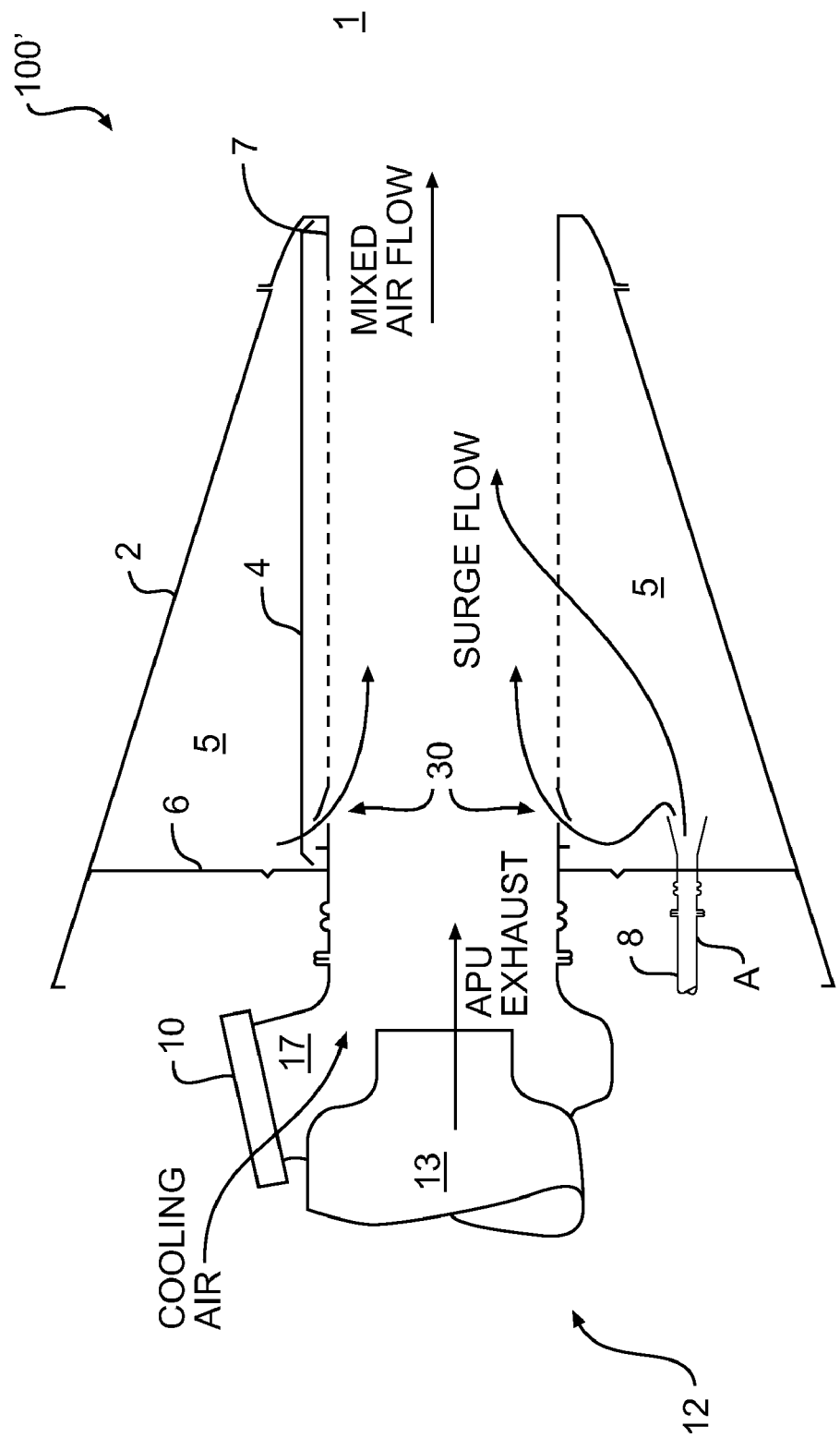

(See FIG. 5). Diffuser A is a conical, flared fitting that resembles a funnel. Diffuser B may be the diffuser A with the open end capped by a bulbous porous or a perforated cover/cap. Diffuser C may also be the diffuser A with a plate or a diverter device arranged perpendicularly to the bleed air discharge pipe 8 and spaced away from the diffuser such that air impinges on the under surface of the plate and escapes radially from the diffuser. In other equivalent embodiments, the diffusers may take other numerous alternative forms such as a perforated pipe extending into, or through, the backing cavity 5.

Figure 3:
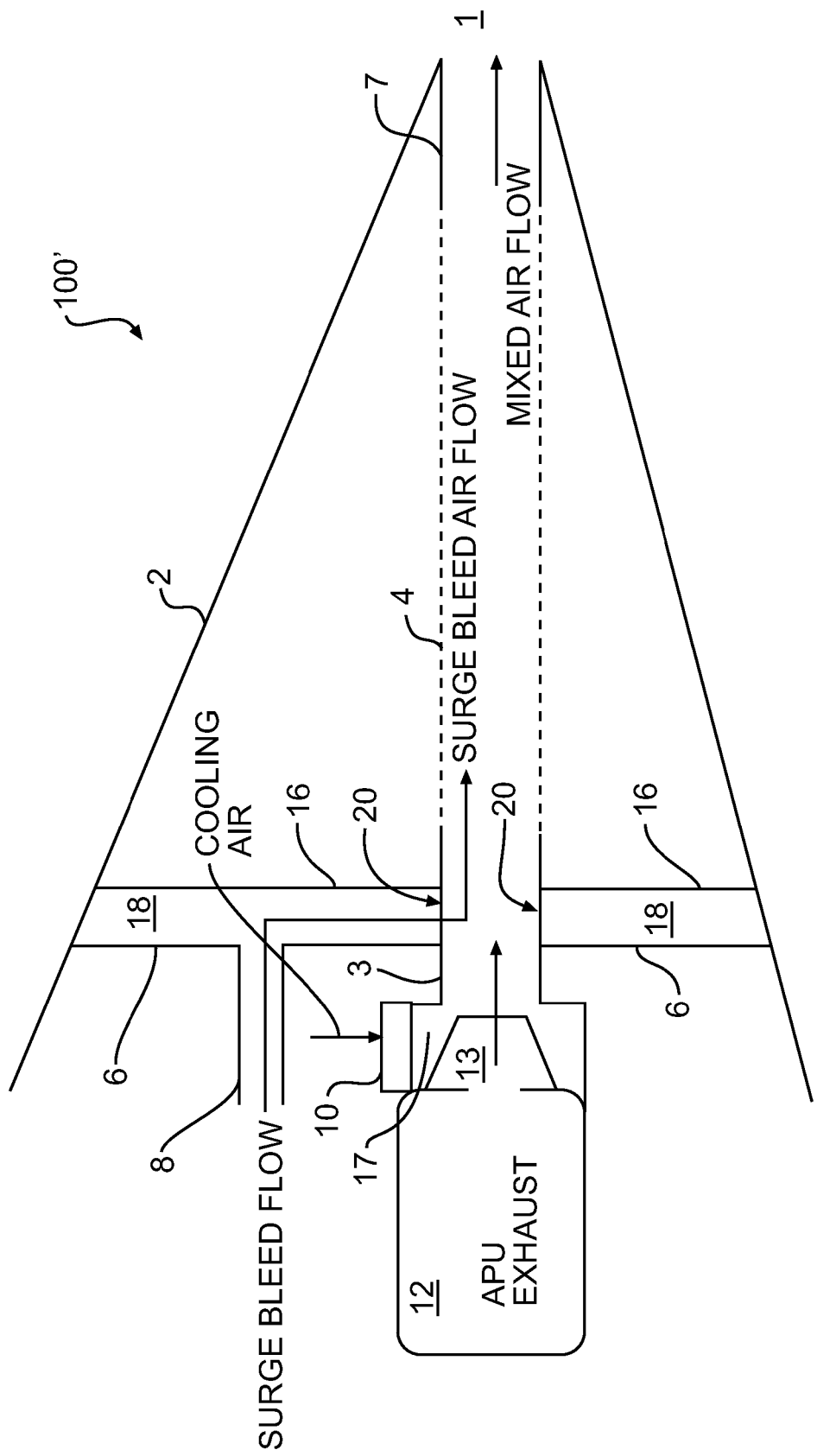

FIG. 3 is a simplified cross sectional view of another exemplary embodiment of the ITM 100'. FIG. 3 is essentially the same as the ITM 100' of FIG. 2 with the exception that a hard baffle 16 has been added at a specific axial distance aft of the firewall bulkhead 6 to create a surge bleed plenum 18. The surge bleed plenum 18 may reduce the surge bleed air noise signature relative to the embodiments of FIG. 2.

The axial distance between the firewall bulkhead 6 and the hard baffle 16 may be any suitable distance commensurate with the volume and pressure of the bleed air to be discharged and the size of the diffuser (A-C), if any, such that a significant back pressure does not form in the oil cooler plenum 17. The hard baffle 16 may be sealedly attached to the porous exhaust liner 4 or may only circumferentially allow the porous exhaust liner to pass therethrough, as may be found most advantageous in a particular application. Similarly the outer perimeter of the hard baffle 16 may be sealedly attached to the tail cone 2, or it may not to allow surge bleed air to escape around its periphery into the backing cavity 5.

In some embodiments, the length of the porous exhaust liner 4 extending between the firewall bulkhead 6 and the hard baffle 16 may be constructed of perforated sheet metal 20 (i.e., perforate) with a plurality of various-shaped holes penetrating therethrough of a suitable size as to accommodate the volume and pressure of the surge bleed air when periodically discharged. In other embodiments the length of the porous exhaust liner 4 between the firewall bulkhead 6 and the hard baffle 16 may be constructed of a "linear" liner such as compressed wire sheeting (e.g., Poroplate®) or compressed metallic shapes (e.g., Feltmetal), or constructed from both perforate 20 and a "linear" liner.

Figure 4:
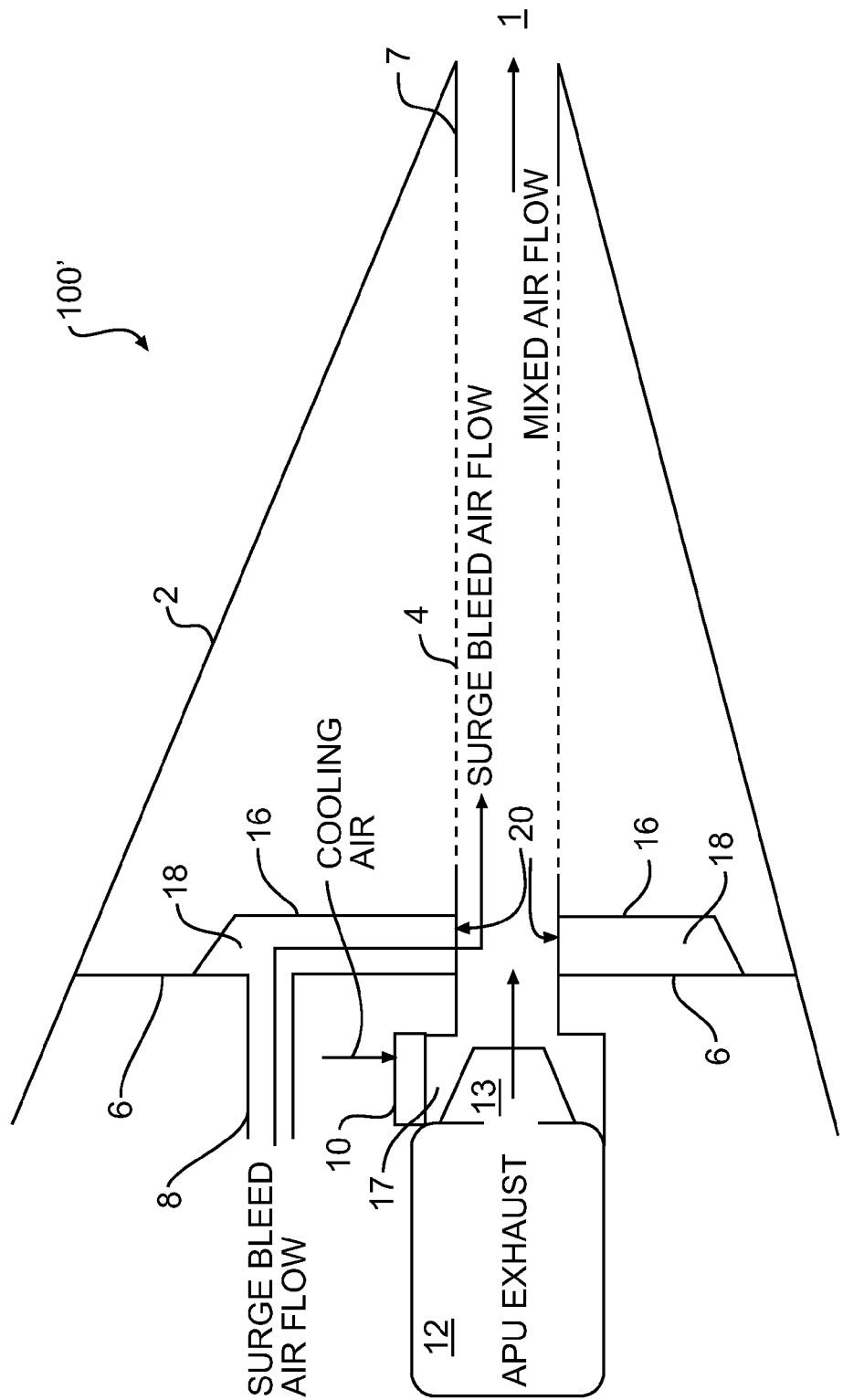

FIG. 4 is a simplified cross sectional view of an exemplary embodiment of an ITM 100'. FIG. 4 is essentially the same as the ITM 100' of FIG. 3 with the exception that the hard baffle 16 has been radially truncated to create a smaller surge bleed plenum 18. The smaller surge bleed plenum 18 may reduce weight and any surge bleed air noise signature relative to the embodiments of FIG. 3.

In some embodiments, the outer circumferential edge of the hard baffle 16 may be sealedly attached to the firewall bulkhead 6. In other embodiments the hard baffle 16 may be loosely or flexibly fitted to the firewall bulkhead 6 to allow surge bleed air to escape into the backing cavity 5 around the circumferential edge of the hard baffle 16. The circumferential edge of the hard baffle 16 may also contain perforations or passages to allow some surge bleed air to escape into the backing cavity 5.

FIG. 5 is a simplified cross sectional view of another exemplary embodiment of an ITM 100'. FIG. 5 is essentially the same as the ITM of FIG. 3 and illustrates features of the porous exhaust liner 4 that may be selectively incorporated into any of the previously described embodiments. In FIG. 5 an annular opening 30 has been added to the porous exhaust liner 4 proximate to, and downstream from, the firewall bulkhead 6. The placement of the annular opening may also be simultaneously upstream of a hard baffle 16 (e.g., See, FIG. 3), if any. The purpose of the annular opening 30 is to facilitate the surge bleed air flow from the bleed air discharge pipe 8 into the porous exhaust liner 4, for improved sound abatement.

Figure 6:
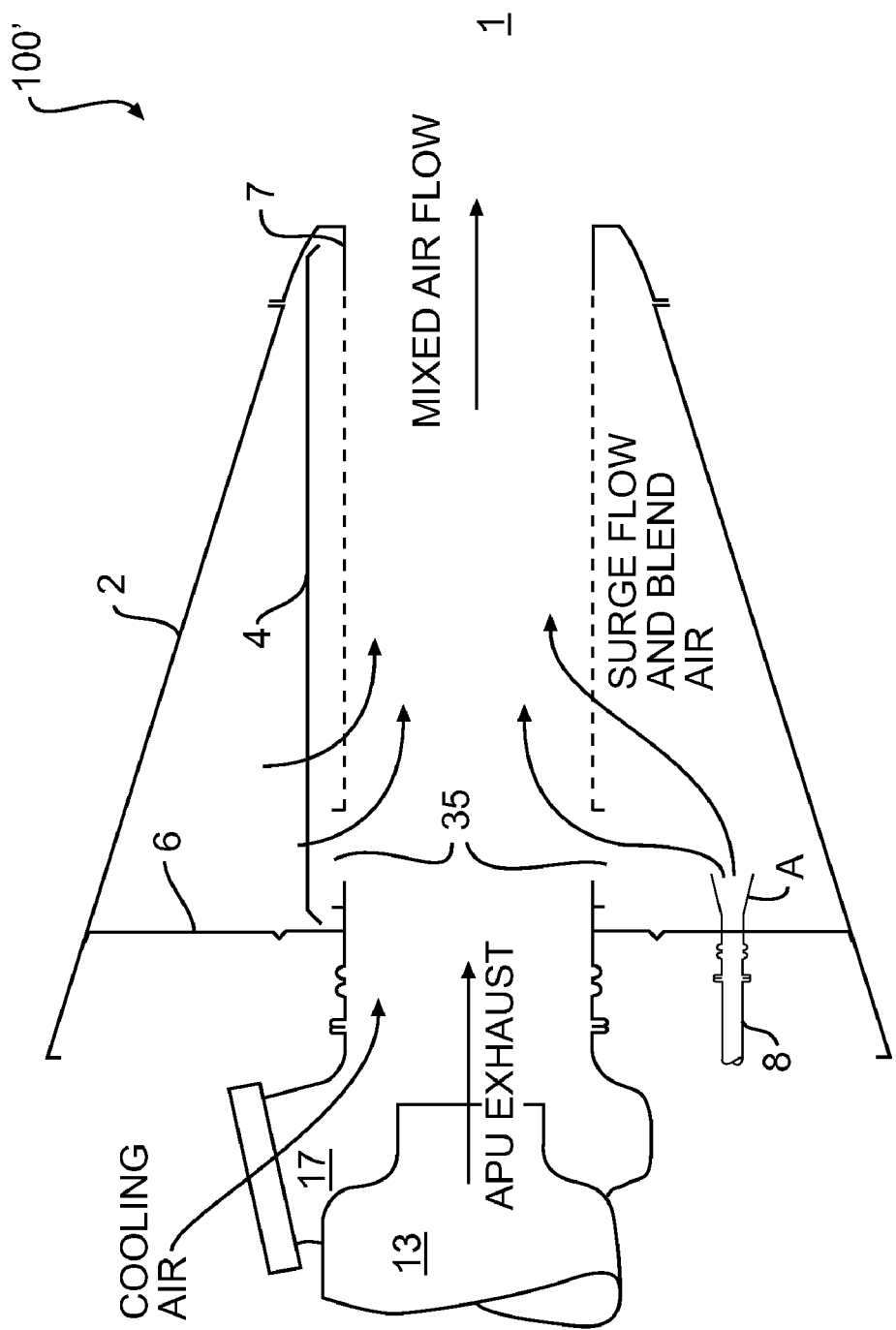

Similarly, FIG. 6 is a simplified cross sectional view of another exemplary embodiment of an ITM 100'. FIG. 6 is essentially the same as the ITM of FIG. 5 and is presented to illustrate features of the porous exhaust liner 4 that may be selectively incorporated in any of the previously described embodiments. In FIG. 6 the annular opening 30 has been replaced with a section containing angled effusion holes 35 added to the porous exhaust liner 4 proximate to and downstream from the firewall bulkhead 6. The placement of the annular effusion holes 35 may also be simultaneously upstream of the hard baffle 16, if any.

The purpose of the angular effusion holes 35 is to directionally introduce the surge air flow from the bleed air discharge pipe 8 into the porous exhaust liner 4 as may be desired, but in a more controlled manner. The angular effusion holes 35 are angled inward and toward the rear of the porous exhaust liner 4 to allow surge air to more freely exit the backing cavity 5 in the rearward direction but to make it more difficult for mixed airflow to enter the backing cavity 5 in the reverse direction.

Figure 7:
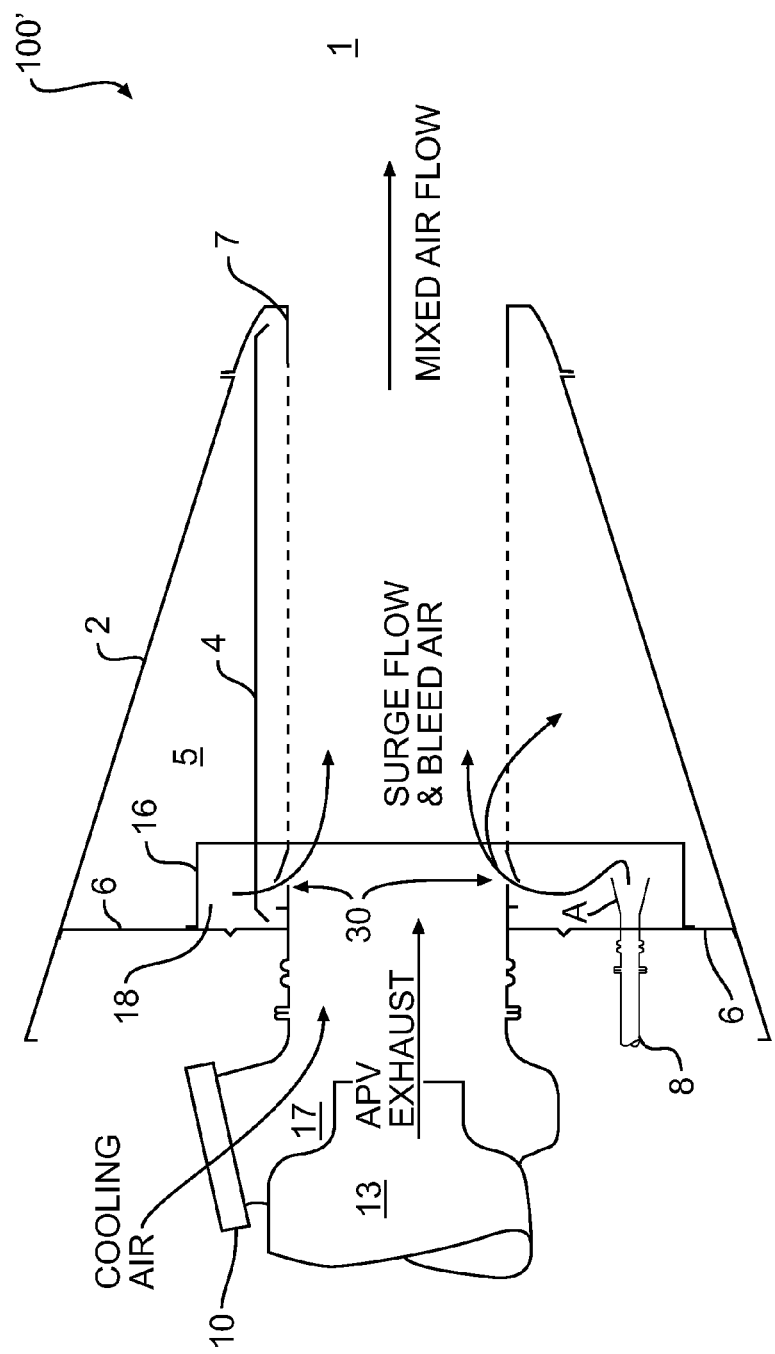

FIG. 7 is a simplified cross sectional view of another exemplary embodiment of an ITM 100'. FIG. 7 is essentially the same as the ITM of FIG. 5 and illustrates an exemplary embodiment including the annular opening 30 of FIG. 5 located between the firewall bulkhead 6 and the hard baffle 16. The annular opening 30 allows the surge bleed air discharge to freely enter the porous exhaust liner 4 from the surge bleed plenum 18 and possibly into the backing cavity 5 through the porous exhaust liner 4.

Figure 8:
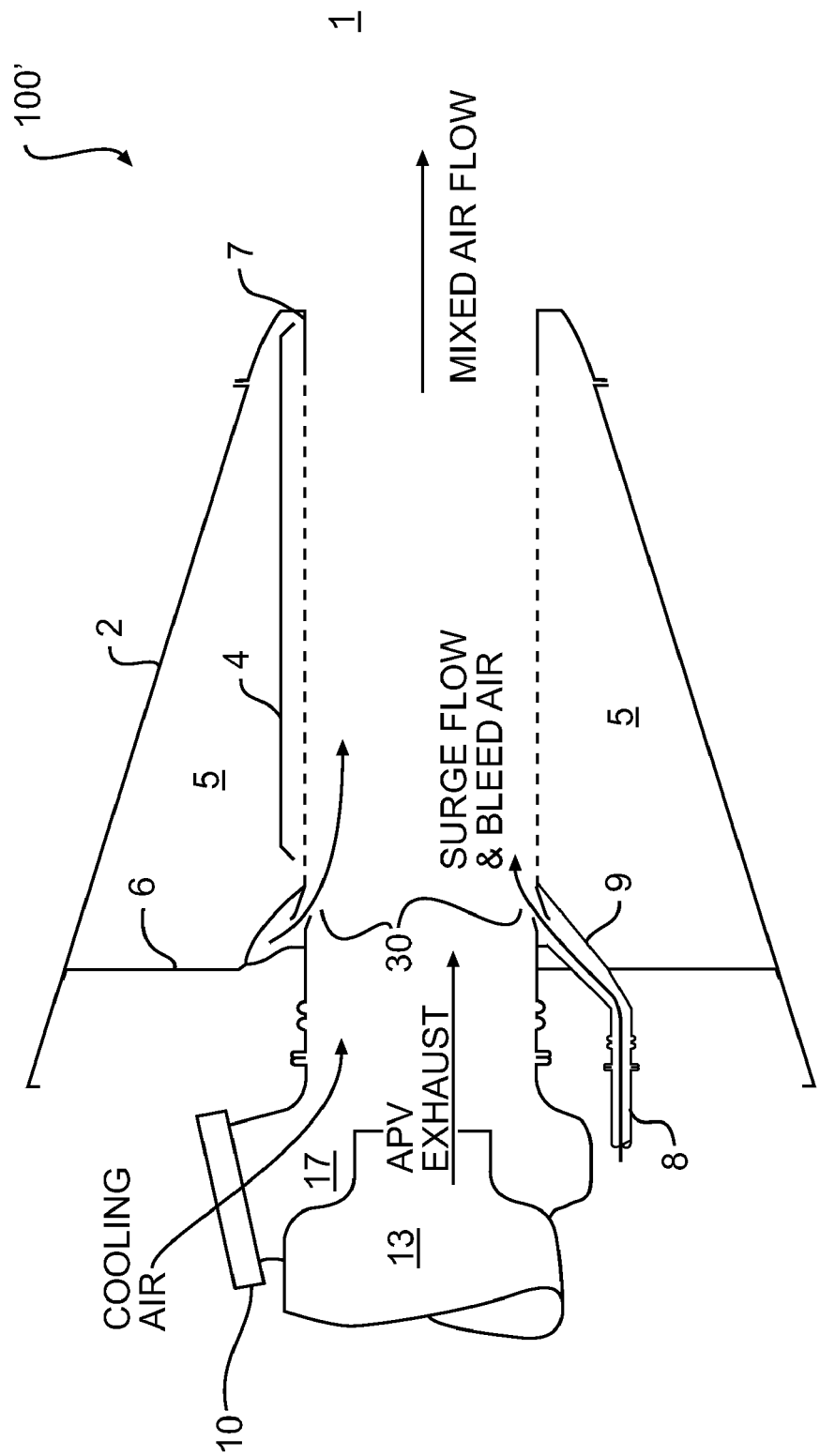

FIG. 8 is a simplified cross sectional view of an exemplary embodiment of an ITM 100'. FIG. 8 is essentially the same as the ITM of FIG. 5 and illustrates another exemplary embodiment including the annular opening 30 of FIG. 5 located between the firewall bulkhead 6 and the hard baffle 16. The primary difference between FIGS. 5 and 8 is that in FIG. 5 the bleed air discharge pipe 8 discharges directly into the backing cavity 5, while in FIG. 8 the diffuser "A" discharges into the porous exhaust liner 4 via an annular opening 30.

Figure 9:
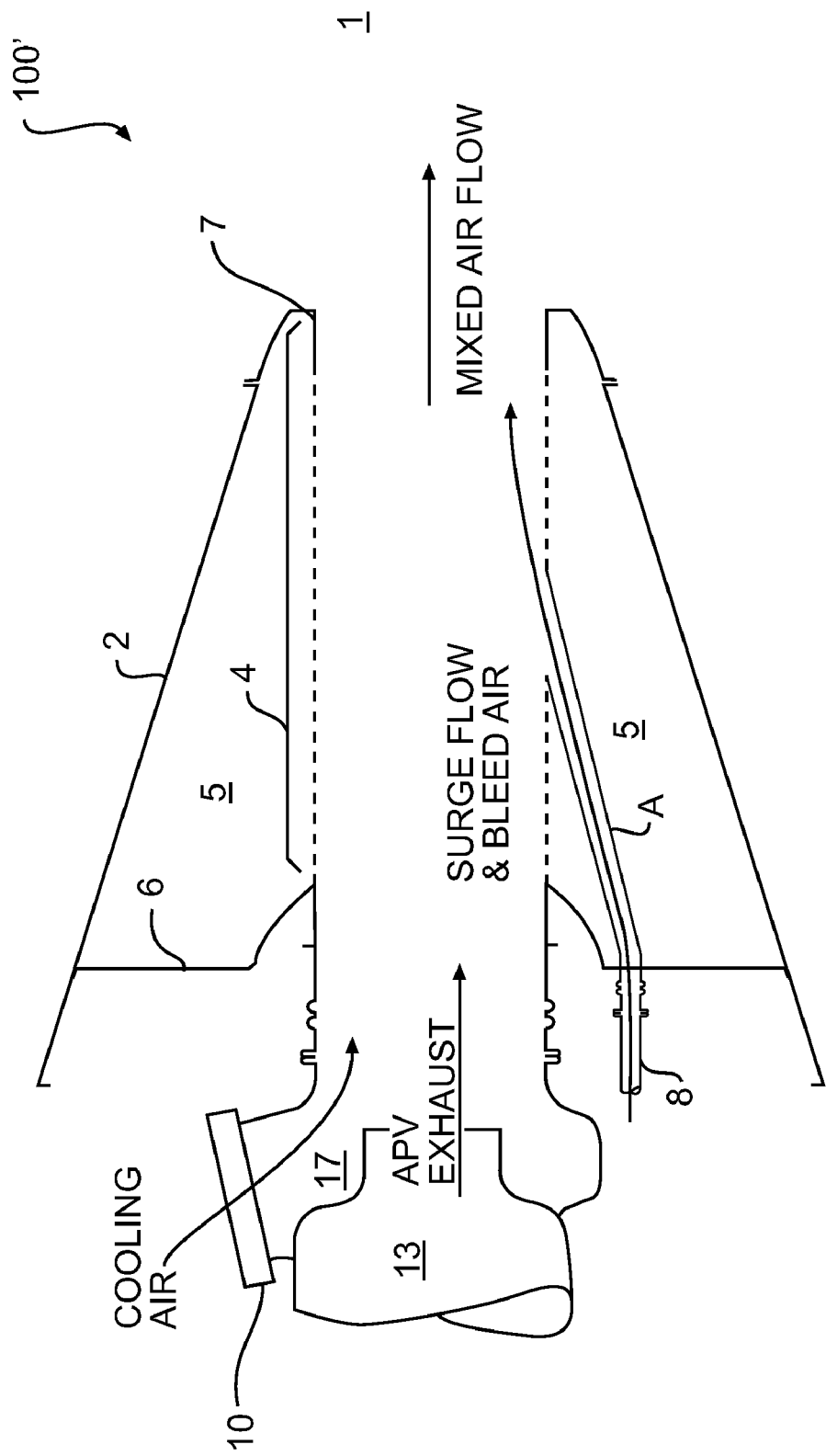

FIG. 9 is a simplified cross sectional view of an exemplary embodiment of an ITM 100'. FIG. 8 is essentially the same as the ITM of FIG. 8 and illustrates another exemplary embodiment without the annular opening 30. The primary difference between FIGS. 8 and 9 is that in FIG. 9 the bleed air discharge pipe 8 discharges directly into the porous exhaust liner 4 at a point much further aft from the firewall bulkhead 6, while in FIG. 8 the diffuser "A" (See FIG. 2) discharges just aft of the firewall bulkhead 6. The difference in axial location along the porous exhaust liner 4 is dependent on a trade off between noise level concerns, where discharge into the porous exhaust liner 4 is preferably just aft of the firewall bulkhead 6, and back pressure concerns in the oil cooler plenum, which would be advantageously mitigated with the surge air discharge being located further aft.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A low-noise integrated tailcone muffler (ITM) assembly for use in an aircraft tailcone having a gas turbine engine that exhausts gasses therethrough, comprising:
   a tailcone defining a conical backing cavity, the conical backing cavity having a large forward end and a narrow extreme aft end;
   a permeable exhaust liner with a first end and a second end, the first end coupled to an oil cooler eductor discharge plenum of the gas turbine engine and a second end discharging directly to atmosphere via the narrow extreme aft end of the conical backing cavity;
   a bleed air discharge conduit configured to discharge pressurized bleed air from the gas turbine engine into the conical backing cavity; and
   a firewall bulkhead defining the large forward end of the conical backing cavity, defining a first aperture passing the porous exhaust liner and defining a second aperture passing the bleed air discharge conduit, the firewall bulkhead extending radially from both of the porous exhaust liner and the bleed air discharge conduit.

2. The ITM of claim 1, wherein the conical backing cavity is configured to accept the pressurized bleed air discharged from the bleed air discharge conduit until the pressurized bleed air dissipates to the atmosphere through the porous exhaust liner and out the second end of the porous exhaust liner.

3. The ITM of claim 1 wherein, the porous exhaust liner consists of one or more of a group of materials that includes a perforated plate, a metal mesh, or a combination of both the perforated plate and the metal mesh, wherein further the perforated plate and the metal mesh may comprise one of a metal material and a carbon composite material.

4. The ITM of claim 1, further comprising a hard baffle defined by an outer circumference and defining an aperture therethrough to pass the porous exhaust liner, the hard baffle located aft of and substantially parallel to the firewall bulkhead, the hard baffle being situated so as to form a surge plenum configured to accept the pressurized bleed air discharge.

5. The ITM of claim 4, wherein a length of the porous exhaust liner extending between the firewall bulkhead and the hard baffle comprises perforated sheet metal.

6. The ITM of claim 5, wherein the surge plenum is configured to accept the pressurized bleed air discharged from the bleed air discharge conduit until the pressurized bleed air discharge dissipates to the atmosphere through the perforated sheet metal into the porous exhaust liner and out the second end of the porous exhaust liner.

7. The ITM of claim 6, wherein the surge plenum is formed by attaching the outer circumference of the hard baffle to the firewall bulkhead.

8. The ITM of claim 1 further comprising an annular opening in the porous exhaust liner proximate to and downstream from the firewall bulkhead.

9. The ITM of claim 1, wherein the porous exhaust liner comprises a plurality of angled effusion holes in the porous exhaust liner proximate to, and downstream from, the firewall bulkhead.

10. The ITM of claim 7, wherein the porous exhaust liner comprises an annular opening between the firewall bulkhead and the hard baffle.

11. The ITM of claim 1, wherein the bleed air discharge conduit discharges pressurized bleed air directly into the porous exhaust liner immediately abaft the firewall bulkhead.

12. The ITM of claim 1, wherein the bleed air discharge conduit discharges pressurized bleed air directly into the porous exhaust liner distantly abaft the firewall bulkhead.

13. The ITM of claim 1, wherein the bleed air discharge conduit includes a diffuser attached to the bleed air discharge conduit abaft and proximate to the firewall bulkhead.

14. The ITM of claim 13 wherein the diffuser consist of one of a group of diffuser configurations including an open end funnel shaped diffuser, a funnel shaped diffuser with perforated dome shaped cover and a funnel shaped diffuser with a cover plate attached perpendicular to a longitudinal axis of, and spaced away from the bleed air discharge conduit.

15. The ITM of claim 1, comprising a second gas turbine engine exhausting to a second oil cooler eductor discharge plenum.

16. The ITM of claim 15, wherein the gas turbine engine and the second gas turbine engine share the bleed air discharge conduit.

17. A method for minimizing noise generated while discharging pressurized air from one or more aircraft gas turbine engines, the method comprising steps of:
   creating a conical backing cavity defined by a tail cone of an aircraft having a large forward end and a narrow extreme aft end venting to an ambient atmosphere, wherein the large forward end is defined by a firewall bulkhead;
   inserting a permeable exhaust liner comprising a first end and a second end through the conical backing cavity, the permeable exhaust liner extending through the aperture in the firewall bulkhead and the second end terminating at the narrow extreme aft end of the conical backing cavity;
   inserting a pressurized air discharge conduit through a second aperture in the firewall bulkhead into the conical backing cavity; and
   discharging pressurized air into the large forward end of the conical backing cavity,
   wherein a pressure increase from the pressurized air discharged into the conical backing cavity is immediately and partially dissipated by a relatively large size of the conical backing cavity and the pressure of the pressurized air is further reduced as the pressurized air flows through the porous exhaust liner and is discharged to the ambient atmosphere via its second end.

18. The method of claim 17 further comprising, installing a hard baffle, the hard baffle defined by an outer circumference and defining an aperture therethrough to pass the porous exhaust liner, the hard baffle installed aft of and substantially parallel to the firewall bulkhead, the hard baffle being situated so as to form a surge plenum configured to accept the pressurized air, wherein the pressurized air is discharged into the surge plenum and flows into the porous exhaust liner.

19. The method of claim 18, wherein the pressurized air flows either into the conical backing cavity through the porous exhaust liner or flows to the ambient atmosphere via its second end.

20. The method of claim 17, further comprising mounting a diffuser to the pressurized air discharge conduit, the diffuser configured to redirect the pressurized air.

* * * * *